United States Patent
Hewitt et al.

(10) Patent No.: US 7,591,191 B2
(45) Date of Patent: Sep. 22, 2009

(54) MULTIPHASE FLOW METER FOR HIGH GAS VOLUME FRACTION SYSTEMS

(75) Inventors: Geoffrey Frederick Hewitt, Wallingford (GB); Gioia Falcone, South Hampstead (GB)

(73) Assignee: Imperial College Innovations, Ltd., London (GB)

( * ) Notice: Subject to any disclaimer, the term of this patent is extended or adjusted under 35 U.S.C. 154(b) by 0 days.

(21) Appl. No.: 10/558,612

(22) PCT Filed: May 28, 2004

(86) PCT No.: PCT/GB2004/002314

§ 371 (c)(1),
(2), (4) Date: Oct. 6, 2006

(87) PCT Pub. No.: WO2004/106861

PCT Pub. Date: Dec. 9, 2004

(65) Prior Publication Data

US 2007/0095136 A1    May 3, 2007

(30) Foreign Application Priority Data

May 28, 2003    (GB) ................................ 0312194.4

(51) Int. Cl.
*G01F 1/74* (2006.01)
*G01F 15/08* (2006.01)
(52) U.S. Cl. .................................. 73/861.04; 73/200
(58) Field of Classification Search .................. None
See application file for complete search history.

(56) References Cited

U.S. PATENT DOCUMENTS

| | | | | | |
|---|---|---|---|---|---|
| 4,312,234 A | * | 1/1982 | Rhodes et al. | ........... | 73/861.04 |
| 4,429,581 A | * | 2/1984 | Furmaga et al. | .......... | 73/861.04 |
| 4,574,643 A | * | 3/1986 | Scott et al. | .................... | 73/200 |
| 4,688,418 A | * | 8/1987 | Cheung et al. | ................ | 73/200 |
| 4,773,257 A | * | 9/1988 | Aslesen et al. | ........... | 73/861.04 |
| 4,813,270 A | * | 3/1989 | Baillie | ...................... | 73/861.04 |
| 5,007,293 A | | 4/1991 | Jung | ........................ | 73/861.04 |
| 5,203,211 A | * | 4/1993 | Jung | ........................ | 73/861.04 |
| 5,390,547 A | * | 2/1995 | Liu | .......................... | 73/861.04 |
| 5,461,930 A | | 10/1995 | Farchi et al. | ............. | 73/861.04 |
| 5,526,684 A | * | 6/1996 | Liu et al. | ...................... | 73/200 |
| 6,032,539 A | * | 3/2000 | Liu et al. | ................. | 73/861.04 |
| 6,076,049 A | * | 6/2000 | Lievois et al. | ............. | 73/861.04 |
| 6,234,030 B1 | * | 5/2001 | Butler | ...................... | 73/861.04 |
| 2007/0157708 A1 | * | 7/2007 | Scott | .......................... | 73/32 R |
| 2008/0000306 A1 | * | 1/2008 | Agar et al. | ............... | 73/861.04 |

FOREIGN PATENT DOCUMENTS

EP    0 076 882    4/1983

OTHER PUBLICATIONS

PCT/GB2004/002314 filed May 28, 2004, International Search Report and Written Opinion, dated Nov. 30, 2004, 12 pages.

* cited by examiner

*Primary Examiner*—Harshad Patel
(74) *Attorney, Agent, or Firm*—Lackenbach Siegel, LLP; Andrew F. Young

(57) ABSTRACT

Apparatus and method for measuring one or more fluid flow rates in a gas and liquid multiphase system, in which the multiphase flow is separated in-line into, gas and liquid flows, measurements on the liquid and/or gas streams are taken in the region immediately following the separation, the flows are recombined to form a substantially homogenous mixture and further measurements on the mixture are taken.

13 Claims, 2 Drawing Sheets

MULTIPHASE FLOW METER FOR HIGH GAS VOLUME FRACTION SYSTEMS

CROSS REFERENCE TO RELATED APPLICATIONS

This application claims priority from PCT/GB2004/002314, filed May 28, 2004, which in turn claims priority from GB 0312194.4, filed May 28, 2003, the contents of each of which are fully incorporated herein by reference.

BACKGROUND OF THE INVENTION

1. Field of the Invention

The present invention is directed towards flowmeters and their use to measure flowrates of different fluids. In particular, the invention relates to the measurement of flowrates in multiphase flow regions.

2. Description of the Related Art

The production of gas in the oil and gas industry in particular is, in most cases, associated with the production of liquid hydrocarbons (that form in the reservoir, in the wellbore and/or at the surface as the pressure and temperature drop), free formation water and condensed vapour. Therefore, from a metering point of view the techniques normally implemented for dry gas metering cannot always be applied.

The measurement of flowrates in multiphase flow regions is difficult, particularly when there is a high to very high gas to liquid ratio. In many applications, particularly in the oil industry, there is a need to measure the gas flowrate directly to assist in the control of gas production. Real time measurement of gas and liquid flowrates are critical in terms of product optimisation, field monitoring and reservoir management. In many deepwater reservoirs, economics may dictate that several fields are joined and processed at a central facility and it is therefore essential that the quantity of gas produced at each well head is known to be able to assign assets to each reservoir.

Wet gas metering can apply to gas condensate fields, high Gas to Oil Ratio (GOR) fields and wet gases (as defined, for example, by reference to the reservoir temperature and cricondotherm of a reservoir fluid). The simplest definition of wet gas is a gas which contains some liquid, more particularly a gas stream with a liquid volume fraction between 5 and 10% at metering conditions. The amount of liquid can vary from a very small of amount of, for example, water to a substantial amount of, for example, a mixture of water and liquid hydrocarbons. The amount and nature of the liquid present and the physical conditions (pressure, temperature, flow rates) all affect flowrate measurements.

Applying this basic definition, wet gas metering can either be seen as the top boundary of multiphase flow metering (oils with high gas volume fractions) or the bottom boundary of gas metering (gases with "high" liquid volume fractions). This implies that by pushing either multiphase flow metering or gas metering to their extremes, wet gas metering solutions could, in theory, be found. However, due to the complexity and peculiarity of wet gas flows, this is not possible.

The occurrence of slip between the liquid and the gas, the difficulties in predicting the transition between flow regimes in horizontal as well as in vertical currents, and the uncertainties related to the PVT characterisation of gas condensate fields are among the problems associated with wet gas metering. In addition to the above, the liquid phase of wet gas streams is frequently a combination of hydrocarbons and water, in which case wet gas metering becomes a problem in three-phases and the oil/water inversion point may have a significant impact on the multiphase flow correlations used to calculate pressure drops and boundaries between flow regimes. Finally, solids may also be present in the stream, so that the problem of wet gas metering extends to four phases.

Attempts are being made across the oil and gas industry to define the boundaries between humid gas, gas-condensate and high GVF (gas volume fraction) multiphase systems. For the different systems, various commercial wet gas meters are known for specific field applications. In some cases, single-phase gas metering devices are used together with "correction factors" to take into account the effect of the liquid present. These devices include orifice plates, inverted venturi (V-cone), venturi tubes, coriolis and ultrasonic meters. Alternatively, elements of multiphase metering technology which were intended for in-line measurements of oil, water and gas streams have been modified to develop wet gas metering systems.

Unfortunately, each of these systems has problems associated with them, particularly at the higher gas volume fractions.

There is therefore a need to provide a metering system which can measure flowrates in multiphase flows at a range of gas volume fractions, particularly higher gas volume fractions.

OBJECTS AND SUMMARY OF THE INVENTION

An object of the present invention is to provide a metering system which can measure flowrates in multiphase flows at a range of gas volume fractions, particularly higher gas volume fractions.

The present invention relates to an apparatus and method for measuring one or more fluid flow rates in a gas and liquid multiphase system, in which the multiphase flow is separated in-line into, gas and liquid flows, measurements on the liquid and/or gas streams are taken in the region immediately following the separation, the flows are recombined to form a substantially homogenous mixture and further measurements on the mixture are taken.

According to one embodiment of the present invention there is provided a flowmeter for measuring one or more fluid flow rates in a gas and liquid multiphase system, in which the multiphase flow is separated in-line into gas and liquid flows, measurements on the liquid and/or gas streams are taken in the region immediately following the separation, the flows are recombined to a substantially homogeneous mixture and further measurements on the mixture are taken.

The separation of the multiphase flow into gas and liquid streams within the existing pipe avoids the need for expensive and disruptive apparatus to draw samples off from the multiphase stream for separating and testing. It also allows for measurements to be taken in real time reflecting the current flow of the stream.

Optionally, the multiphase flow is separated into a core of gas and a film of liquid on the internal wall of the pipe. Measurement of the properties of the liquid can then be made from which the total liquid mass flux can be calculated. Preferably the separation of the phases is initiated by a twisted tape device.

The thickness of the liquid film on the internal wall of the pipe is preferably measured by means of gamma ray densitometry, conductance, ultrasonics or fluorescents.

According to another embodiment of the present invention, after recombination of the gas and liquid streams, further measurements of the properties of the mixed stream can be taken and, using the known properties of the liquid, the properties of the gas stream can be calculated. Preferably the recombination of the gas and liquid phases is initiated by an expansion contraction device. Preferably the stream is passed to a venturi for measurement of the properties of the mixed stream.

In another embodiment of the present invention, there is provided a method for measuring the flowrates of gas and/or liquid components of a multiphase fluid stream, in which the multiphase fluid is passed to a flowmeter in which the multiphase stream is first separated in-line into gas and liquid streams whereby measurements on the liquid and/or gas streams are taken, and the streams are subsequently recombined into a substantially homogeneous mixture whereby measurements of the mixture are taken, and the respective flowrates are calculated. The preferred features of the present invention set out above apply equally to the method.

The above, and other objects, features and advantages of the present invention will become apparent from the following description read in conduction with the accompanying drawings, in which like reference numerals designate the same elements.

DETAILED DESCRIPTION OF THE PREFERRED EMBODIMENTS

Figure 1:
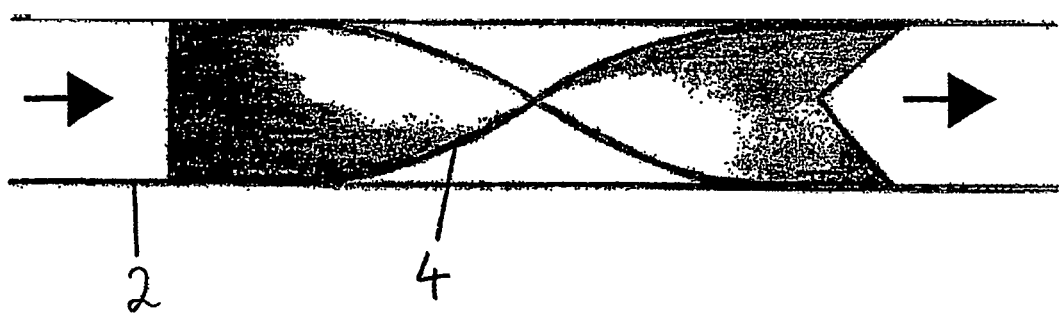
FIG. 1 is a side view of a twisted tape with fish tales according to one embodiment of the present invention that may be used to separate a multiphase stream into a gas core and a liquid annulus around the inside wall of a pipe.

Reference will now be made in detail to one or more embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, up, down, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

In one embodiment of the present invention, the fluid flow measurements are made in vertical upward flow and are specifically for annular flow, the dominant regime involved. In sequence, the steps of this embodiment are as follows:

1. The multiphase stream flows in annular flow up a tube and through a twisted tape device (with "fish tails" at its upper end) as shown in FIG. 1.

2. Downstream of the twisted tape device, substantially all of the liquid phase has been separated into an annular film on the tube wall. It continues to flow as a largely annular film in a straight pipe section downstream of the twisted tape device. Some re-entrainment of the droplets into the gas stream will occur but this process is relatively slow and there is an opportunity of making measurements in the region immediately downstream of the twisted tape device in order to determine the liquid flow rate in the film and hence the total liquid flow rate within the multiphase flow.

The liquid flow rate is determined by measuring the liquid film thickness ($\delta$) and the pressure gradient ($dp/dz$) along the straight pipe section. The pressure gradient can be measured using standard transducer systems (taking care to avoid problems of ambiguity of the line fluid) and the film thickness can be measured by a variety of techniques. One particular system for measuring the thickness uses gamma densitometry and conductance, but alternatives include ultrasonics or fluorescents, depending on the system. The liquid film flow rate, $\dot{M}_{LF}$, is obtained from the "triangular relationship" which has the form $$\dot{M}_{LF} = fn[\delta, (dp/dz)] \tag{1}$$

Basically, in this relationship, the interfacial shear stress and wall shear stress (often approximately equal) are calculated from the pressure gradient and the local shear stress $\tau$ (often approximately constant in the liquid film) is related to the gradient of liquid velocity in the film ($du_L/dy$) by the expression:

$$\tau = \mu_{eff}\left(\frac{du_L}{dy}\right) \tag{2}$$

where $\mu_{eff}$ is the effective viscosity calculated from a suitable turbulence model. Equation [2] is integrated to give the velocity profile in the film, which, in turn, is integrated to give the total liquid flow rate. Experiments in which all three quantities ($\dot{M}_{LF}$, $\delta$ and $(dp/dz)$) were measured, showed that the triangular relationship fitted the data remarkably well. Thus, the liquid film flow rate can be determined from measurements of the film thickness and the pressure gradient.

Experimental measurements have indicated good separation of the liquid by the twisted tape device shown in FIG. 1, with less than 5% of the liquid remaining as droplets after the device at lower gas velocities.

Figure 2:
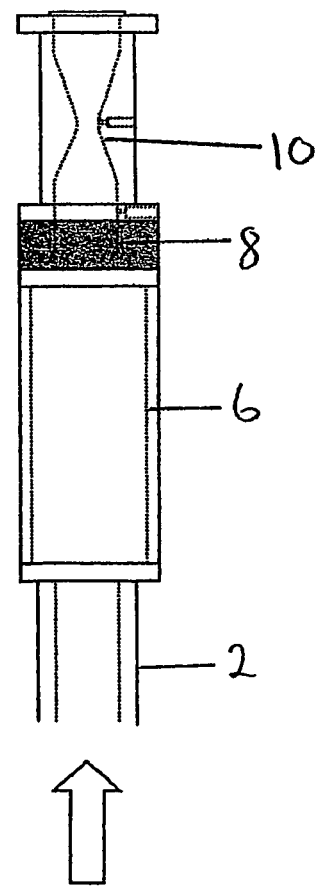
FIG. 2 is an expansion contraction device that may be used to recombine a gas and liquid into a substantially homogeneous multiphase stream.

3. Following the straight pipe section in which the liquid film thickness and pressure gradient are measured, (leading to an evaluation of $\dot{M}_L$), the next step is to re-entrain substantially all of the liquid droplets back into the gas stream before passing this stream into a venturi (step 4.). The objective is to substantially homogenise the gas and the liquid. Any suitable apparatus for the mixing of the gas and liquid can be used, but an expansion contraction system as shown in FIG. 2 is particularly preferred. Measurements of liquid film flow rates downstream of such a device indicated a large increase in the fraction entrained compared to measurements taken in the absence of the device.

4. The final stage is to pass the substantially homogenised flow through a venturi to measure the properties of the multiphase stream. The most widely used relationships for two-phase pressure drop calculations in Venturi meters are those of Chisolm, which relate the two-phase pressure drop $\Delta p$ to the pressure drops $\Delta pLO$ or $\Delta pGO$ for the liquid and gas phase respectively flowing alone through the device. These relationships can be written as:

$$\frac{\Delta p}{\Delta p_{LO}} = 1 + \frac{C}{X} + \frac{1}{X^2} \tag{3}$$

-continued $$\frac{\Delta p}{\Delta p_{GO}} = 1 + CX + X^2$$

where X is the Lockhart-Martinelli parameter defined as follows:

$$X = \sqrt{\frac{\Delta p_{LO}}{\Delta p_{GO}}} \quad [4]$$

and the parameter C, with the assumption of homogeneous flow, is given by:

$$C = \left(\frac{\rho_L}{\rho_G}\right)^n + \left(\frac{\rho_G}{\rho_L}\right)^n \quad [5]$$

where $\rho_L$ and $\rho_G$ are the liquid and gas densities. In the calculation of the parameter C, the effects of the line pressure are accounted for by means of the gas density and the effects of the gas Froude number can be included in the parameter n.

The pressure drops $\Delta P_{LO}$ or $\Delta p_{GO}$ for the liquid and gas flowing alone through the venturi are given by:

$$\Delta p_{LO} = -k\frac{\dot{m}_L^2}{2\rho_L} \quad [6]$$

$$\Delta p_{GO} = -k\frac{\dot{m}_G^2}{2\rho_G}$$

where $m_L$ and $m_G$ are the liquid and the gas mass fluxes respectively.

The venturi loss coefficient k is given by:

$$k = \frac{1 - \left(\frac{D_2}{D_1}\right)^4}{C_D^2 \left(\frac{D_2}{D_1}\right)^4} \quad [7]$$

where $C_D$ is the discharge coefficient (usually taken as 0.984 for a venturi with flow at high Reynolds numbers) and $D_2$ and $D_1$ are the throat diameter and the upstream diameter respectively.

Combining equations [4] and [6] leads to the following expression for the Lockhart-Martinelli parameter:

$$X = \frac{\dot{m}_L}{\dot{m}_G}\left(\frac{\rho_G}{\rho_L}\right)^{\frac{1}{2}} \quad [8]$$

Combining the above equations leads to a quadratic expression for the gas flow rate as follows:

$$a\dot{m}_G^2 + b\dot{m}_G + c = 0 \quad [9]$$

where:

$$a = 1 \quad [10]$$

$$b = C\dot{m}_L \sqrt{\frac{\rho_G}{\rho_L}}$$

$$c = \left(1 + \frac{2\rho_L \Delta p}{k\dot{m}_L^2}\right)\frac{\rho_G}{\rho_L}\dot{m}_L^2$$

Of course, Eq. [9] is a quadratic equation, which has two solutions for $M_G$. However, one of the solutions is usually negative and therefore unphysical. For n=0.5, the above Chisolm equation for homogeneous flow (Eq. [3]) gives the same results as the general equation for a homogeneous two-phase gas-liquid flow written as follows:

$$\Delta p = -k\frac{(\dot{m}_L + \dot{m}_G)^2}{2\rho_H} \quad [11]$$

where $\rho_H$ is the mixture density given by, in terms of quality x:

$$\rho_H = \frac{\rho_L \rho_G}{(1-x)\rho_G + x\rho_L} \quad [12]$$

Experimental tests have shown that the expansion contraction homogenisation device leads to a much closer agreement with the homogeneous model described above than that obtained in the absence of the device.

Referring now to FIG. 1, which shows a twisted tape device 4 which may be used in one embodiment of the present invention to separate the gas and liquid in the multiphase stream into a gas core and a liquid annulus around pipe 2. The multiphase stream flows in the direction indicated by the arrows and, on passing through the device 4, the entrained liquid is forced to the walls of the pipe and the gas continues to pass through the core of the pipe.

Referring now to FIG. 2, which shows an expansion contraction device which may be used in one embodiment of the present invention to recombine the gas and liquid into a substantially homogeneous mixture. Optimally the liquid from the walls of the pipe 2 is completely re-entrained into the gas stream after passing through the expansion zone 6 and the subsequent contraction zone 8. This multiphase stream is then passed to a venturi 10 where measurements of the multiphase stream are taken.

Figure 3:
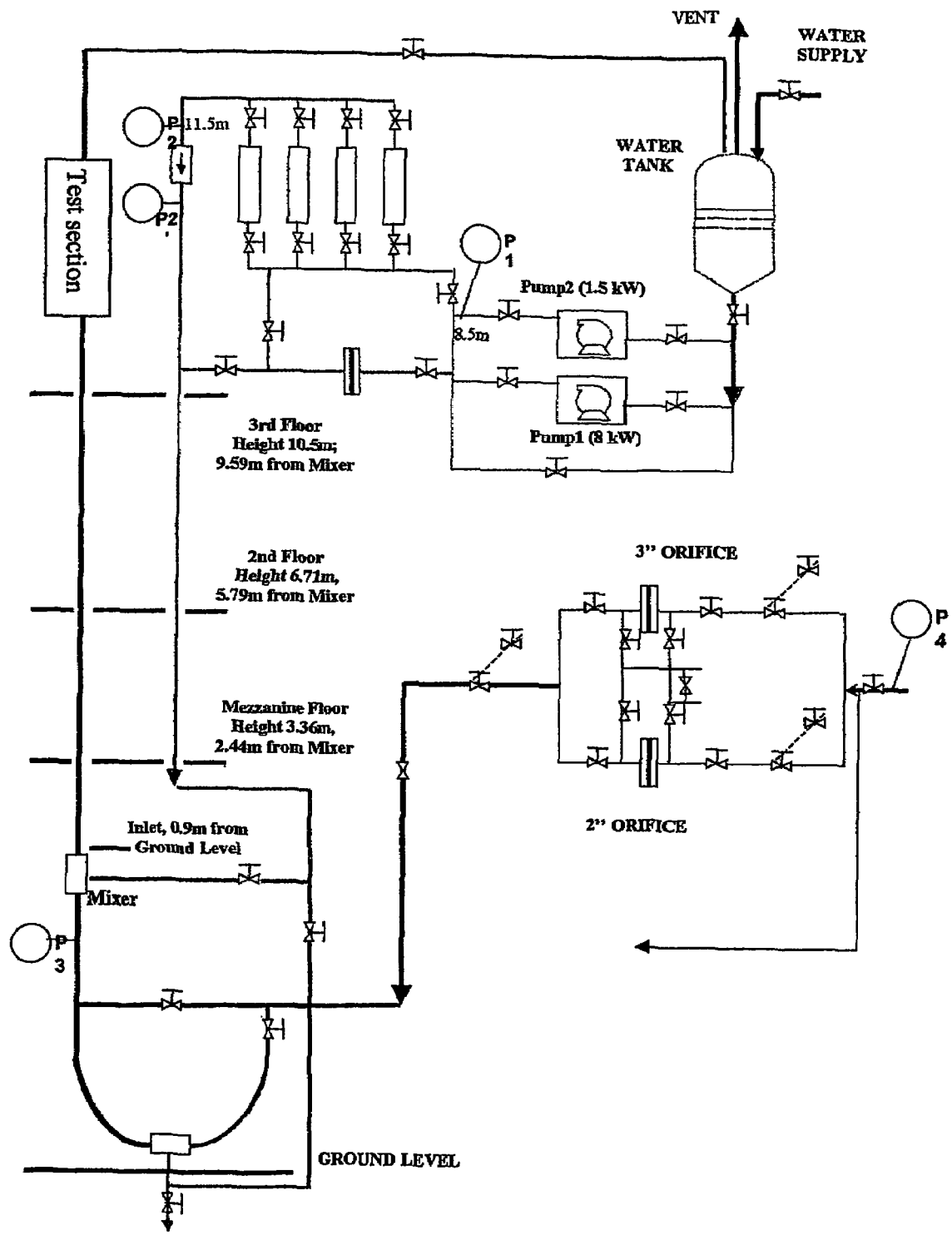
FIG. 3 is a simplified embodiment of a rig incorporating a flowmeter according to one aspect of the present invention.

Referring now to FIG. 3, a simplified diagram of one embodiment of a rig incorporating a flowmeter according to the present invention. The rig consists of a long vertical copper tube with an active length of 10.8 m and internal diameter of 31.8 mm (1.25"). The flowmeter of the present invention was arranged almost entirely at the top end of the rig (labelled "test section"). The tube is attached to a vertical fixed beam, carefully aligned to guarantee the symmetry of the flow. Air from a steady supply (operating at a pressure of up to 6 bar) can flow in a 50.8 mm (2") or a 76.2 mm (3") pipe, where orifice plates are mounted in order to meter the air flow rate by means of differential pressure transducers.

Air is fed into the system at the bottom of the tube via a U-bend. Water from a tank can be pumped through the system by either a 1.5 kW or an 8 kW pump. It is then metered via rotameters located towards the top of the rig and fed into the tube at either 0.9 m or 5.4 m above the air U-bend. For these experiments, both feed points were used simultaneously, as it was noted that such a configuration drastically reduces the pressure drop between the rotameter outlet and the bottom of the test section, compared with the cases when only one of the two feed points is used.

Calculation of the Liquid Mass Flux

The location for the point at which liquid-film thickness measurements were taken was chosen to be approximately ten pipe diameters downstream of the outlet of the twisted tape device. The film thickness was measured using a 45 milliCurie Americium 241 gamma source with a scintillation crystal detection system linked via an amplifier to a computer counting system reading the radiation count at frequencies set by the user. The 59.5 keV energy window was chosen. The film thickness was calculated as follows:

$$\delta = \frac{D}{2} \frac{\ln \frac{I}{I_a}}{\ln \frac{I_w}{I_a}} \quad [13]$$

where D is the internal diameter of the pipe, $I_a$ and $I_w$ are the intensities of the transmitted photons when the pipe is filled with air and water respectively, and I is the intensity of the transmitted photons with the two-phase air-water stream flowing in the pipe. The ratio between the calibration values of air and water is significant because it affects the ability of the photons to 'see' the difference between a pipe full of air and a pipe full of water. This ratio can be written as:

$$\frac{I_a}{I_w} = e^{(\gamma_w - \gamma_a)D} \quad [14]$$

where $\gamma_w$ and $\gamma_a$ are the attenuation coefficients of water and air respectively.

Alternatively, some tests were carried out with conductivity probes in place of the gamma source. The probes were calibrated using an Americium 241 gamma source, as a result of which, the liquid-film thickness was expressed as a function of the normalised output voltage, V*, given by:

$$V^* = \frac{(V - V_0)}{(V_s - V_0)} \quad [15]$$

where V is the output voltage measured during the two-phase experiments, $V_s$ is the output voltage when the pipe is filled with water and $V_0$ is the output voltage when the pipe is filled with air.

The pressure drop to be used, together with the liquid-film thickness, in the triangular relationship (see Eq. [1]) was measured over a straight length of approximately 80 cm, from the outlet of the twisted tape device to the inlet of the expansion contraction device.

Calculation of the Gas Mass Flux

A Venturi meter, 20 cm long and with a Beta (β) ratio of 0.493, was placed immediately downstream of the expansion contraction section. A differential pressure transducer was used to measure the pressure drop between the inlet and the throat of the Venturi, while two absolute pressure transducers were used to measure the inlet and outlet pressure. The inlet and outlet temperatures were also recorded. The inlet pressure and inlet temperature were used to calculate the inlet fluid properties.

The water mass flux varied between 103 and 770 kg/M²s, and for each water mass flux the air mass flux varied approximately between 30 and 200 kg/m²s. A check was made to confirm that the flow was in annular regime and not in churn regime (flow reversal of the falling film):

$$U_G^* = U_G \sqrt{\frac{\rho_G}{gD(\rho_L - \rho_G)}} > 1 \quad [16]$$

where $U_G$ is the gas superficial velocity.

A check was also made to see if there was liquid entrainment in the gas core before the twisted tape:

$$\dot{m}_{LF} \leq \dot{m}_{LFC} \rightarrow E = 0 \quad [17]$$

$$\dot{m}_{LFC} = \frac{\eta_L}{D} \exp\left(5.8504 + 0.4249 \frac{\eta_G}{\eta_L} \sqrt{\frac{\rho_L}{\rho_G}}\right)$$

where $\eta_L$ and $\eta_G$ are the liquid and gas viscosities and E stands for entrainment.

At very low liquid film flow rate ($m_{LF}$), liquid entrainment does not occur—in which case there would be no need to use a swirl device to move liquid back into the film.

The rig has primarily been tested for 2-phase flows (air and water), but the meter could also be used to measure 3-phase flows (air, water, and oil). The thickness of the total liquid layer can be measured and the composition of the constituent components determined. It is then possible to determine the physical properties of the liquid film by averaging the properties of the separate components, making the assumption that the liquid is either a mixture of oil droplets in water or vice versa. The apparatus and method of the present invention therefore apply to a wide range of high GVF systems in which the flowrates of either the gas or the liquid or both need to be measured.

In the claims, means- or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures. A similar analysis is to be understood for methods of measurement, calculation, calibration and other steps or actions within a method.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

The invention claimed is:

1. A flow meter system, for measuring one or more fluid flow rates in a gas and liquid multiphase system, comprising:
   means for in-line separation of a multiphase flow into at least a gas flow and a liquid flow in a first separation region in a pipe;
   means for measuring said liquid and said gas flows in a second measurement region immediately following said first separation region;
   means for recombining said liquid and said gas flows into a substantially homogeneous mixture;
   means for taking further measurements on said substantially homogenous mixture following said means for recombining, whereby said flow meter system enables a flow rate measurement over a range of gas volume fractions, particularly higher gas volume fractions with improved accuracy;
   said means for in-line separation, further comprises:
      means for separating said multiphase flow into a core of gas and a film of liquid on an internal wall of said pipe; and
   said means for measuring said liquid and said gas flows further comprises:
      means for measuring a set of properties of said liquid flow and for enabling a calculation of a total liquid max flux there from.

2. A flow meter system, for measuring one or more fluid flow rates in a gas and liquid multiphase system, comprising:
   means for in-line separation of a multiphase flow into at least a gas flow and a liquid flow in a first separation region in a pipe;
   means for measuring said liquid and said gas flows in a second measurement region immediately following said first separation region;
   means for recombining said liquid and said gas flows into a substantially homogeneous mixture;
   means for taking further measurements on said substantially homogenous mixture following said means for recombining, whereby said flow meter system enables a flow rate measurement over a range of gas volume fractions, particularly higher gas volume fractions with improved accuracy;
   said means for in-line separation, further comprises:
      means for separating said multiphase flow into a core of gas and a film of liquid on an internal wall of said pipe;
      means for measuring a thickness of said film of liquid on said internal wall of said pipe; and
      said means for measuring a thickness is selected from a group comprising: gamma ray densitometry, conductance, ultrasonics, and fluorescence.

3. A flow meter system, for measuring one or more fluid flow rates in a gas and liquid multiphase system, comprising:
   means for in-line separation of a multiphase flow into at least a gas flow and a liquid flow in a first separation region in a pipe;
   means for measuring said liquid and said gas flows in a second measurement region immediately following said first separation region;
   means for recombining said liquid and said gas flows into a substantially homogeneous mixture;
   means for taking further measurements on said substantially homogenous mixture following said means for recombining, whereby said flow meter system enables a flow rate measurement over a range of gas volume fractions, particularly higher gas volume fractions with improved accuracy;
   said means for in-line separation of a multiphase flow further comprises:
      at least an initial twisted tape device; and
   said means for recombining said liquid and said gas flows into a substantially homogeneous mixture, further comprises:
      expansion-contraction device means for initiating said recombination.

4. A flow meter, for measuring one or more fluid flow rates in a gas and liquid multiphase system, comprising:
   means for phase separation in which said multiphase flow is separated in-line into annular gas and liquid flows within the same pipe;
   first measurement means for taking measurements of at least one of said liquid and said gas flows in a region immediately following the separation wherein the flow is separated into said annular gas and said liquid flows in said same pipe;
   means for recombining said liquid and said gas flows into a substantially homogeneous mixture downstream of said measurement means; and
   second measurement means for taking measurements on said substantially homogenous mixture, characterized in that said first measurement means are located before said means for recombining means and measures properties of at least one of said liquid and said gas streams while they are separate annular flows; and
   a thickness of a liquid film on an internal wall of said pipe is measured by at least one of a means of gamma ray densitometry, conductance, ultrasonics, and fluorescence.

5. A flow meter, according to claim 4, in which said liquid film is a single phase.

6. A flow meter, according to claim 5, in which said single phase is one of an aqueous phase and a hydrocarbon phase.

7. A flow meter, according to claim 4, in which the liquid film consists of two phases.

8. A flow meter, according to claim 7, in which said two phases are an aqueous phase and a hydrocarbon phase.

9. A flow meter, according to claim 8, in which said phase separation means comprises a twisted tape device.

10. A flow meter, according to claim 8, in which said recombination of said gas and liquid phases is initiated by an expansion contraction device.

11. A flow meter, according to claim 8, in which said second measurement means further comprises a venturi for measurement of the properties of the mixed stream.

12. A flow meter, according to claim 8, in which said multiphase stream has a liquid volume fraction of less than 10%.

13. A flow meter, according to claim 12, in which the multiphase stream has a liquid volume fraction of less than 5%.

* * * * *